No. 708,380. Patented Sept. 2, 1902.
G. MERLE.
FISH TRAP.
(Application filed Nov. 20, 1901.)
(No Model.)
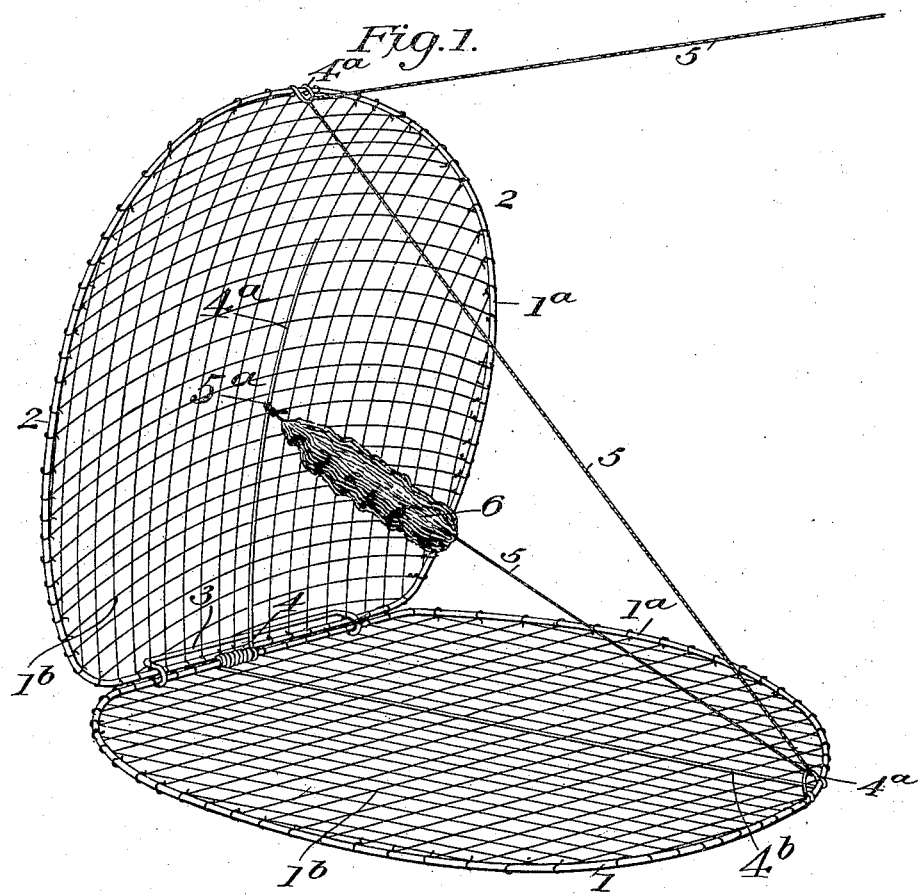
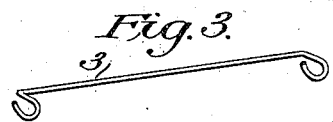
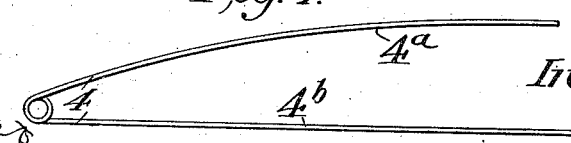
Witnesses: John Yos, Wm. C. Fetzer
Inventor: George Merle.

UNITED STATES PATENT OFFICE.

GEORGE MERLE, OF BROOKLYN, NEW YORK.

FISH-TRAP.

SPECIFICATION forming part of Letters Patent No. 708,380, dated September 2, 1902.

Application filed November 20, 1901. Serial No. 83,066. (No model.)

*To all whom it may concern:*

Be it known that I, GEORGE MERLE, a citizen of the United States, residing at Brooklyn, county of Kings, and State of New York, have invented certain new and useful Improvements in Fishing-Traps, of which the following is a specification, such as will enable those skilled in the art to make and use the same.

The object of this invention is to provide an improved trap which is designed for use in catching fish and crabs; and with this and other objects in view the invention consists in a trap constructed as hereinafter described and claimed.

The invention is fully disclosed in the following specification, of which the accompanying drawings form a part, in which the separate parts of my improvement are designated by the same reference characters in each of the views, and in which—

Figure 1 is a perspective view of my improved trap and showing it in the open position; Fig. 2, a side view showing the trap closed; Fig. 3, a perspective view of a hinge-piece which I employ for connecting the separate parts of the trap together, and Fig. 4 a side view of a spring which I employ for holding the trap open.

In the practice of my invention I provide a trap of the class specified, consisting of a bottom portion 1 and a top portion 2, each of which consists of a ring $1^a$ and a body portion $1^b$, composed of wire gauze or netting, and said bottom and top portions of my improved trap are substantially circular in form except at one end, where they are hinged together and where they are substantially straight, and the body portion of the top part of the trap is convex in form, as clearly shown in the drawings, so as to allow space within the trap when the separate parts are closed together for fish or crabs.

The separate parts of the trap are connected by a hinge-piece 3, having loop-shaped portions at each end, and the body portion of said hinge-piece is at the back of the top portion of the trap, while the loop-shaped end pieces pass around the adjacent wires of the top and bottom portions of the trap, as clearly shown in Fig. 1. I also employ a spring 4, which is wound around the cross-wire of the bottom portion of the trap at the end where the separate parts are hinged together, as clearly shown in Fig. 1, and which is provided with an arm $4^a$, which passes diametrically across the top portion of the trap and is secured thereto, and another arm $4^b$, which passes diametrically across the bottom portion of the trap and is secured thereto, and the operation of this spring is to force the top portion of the trap open and hold it in the open position, as shown in Fig. 1. I also provide a line or cord 5, which is secured to the central part of the top portion of the trap, as shown at $5^a$, and passed through a loop or ring $4^a$ at the edge of the bottom portion of the trap opposite the hinge and a similar loop or ring $4^a$ at the edge of the top portion of the trap opposite the hinge, and said line or cord passes upwardly and is under the control of the manipulator of the trap. In practice a bait 6, of any preferred material, is placed on the line or cord 5 adjacent to the top portion of the trap, and said trap is sunk in the water in the usual manner, and in this operation the spring 4 or arm $4^a$ thereof opens the trap, as will be readily understood, and the bottom portion thereof rests on the ground, this position of the parts being shown in Fig. 1, and in this position of the parts the fish or crabs enter the trap, and any nibble or bite at the bait is at once detected by a slight pull or jerk of the cord or line 5, and the manipulator of the trap, who holds the upper end of said cord or line in his hand, at once pulls thereon and the separate parts of the trap are closed together by the line, which is free to pass through the loops or rings $4^a$, and the fish or crabs are caught within the trap and drawn to the surface, as will be readily understood.

It will be understood that this trap is operated from a boat or other suitable float, and the operation of pulling up the trap, as before described, closes the same and holds it closed until the trap, with the crab or fish contained therein, is deposited in the boat or float, which operation opens the trap and releases the crab or fish.

This device is simple in construction and operation and perfectly adapted to accomplish the result for which it is intended, and changes therein and modifications thereof may be made without departing from the spirit of my invention.

Having thus fully described my invention, what I claim as new, and desire to secure by Letters Patent, is—

A trap of the class described consisting of a top portion and a bottom portion hinged together at one side, the body portion of each of said parts being composed of open network, said trap being also provided with a spring at the hinge for holding the separate parts thereof open and a cord connected with the top portion centrally thereof and passed through a ring or eye at the free edge of the bottom portion and then through a ring or eye at the free edge of the top portion, substantially as shown and described.

In testimony whereof I have hereunto signed my name to this specification in the presence of two subscribing witnesses.

GEORGE MERLE.

Witnesses:
JOHN YOST,
WILLIAM FETZER.